US005190192A

United States Patent [19]

Lina et al.

[11] Patent Number: 5,190,192

[45] Date of Patent: Mar. 2, 1993

[54] INTRINSICALLY SAFE METERING PUMP FOR A PRESSURIZED SPRAY HEAD

[75] Inventors: Jean-Pierre Lina, Le Neubourg; Hervé Pacaud, Auvers-Sur-Oise, both of France

[73] Assignee: Valois, Le Neubourg, France

[21] Appl. No.: 727,165

[22] Filed: Jul. 9, 1991

[30] Foreign Application Priority Data

Jul. 9, 1990 [FR] France ................................ 90 08667

[51] Int. Cl.[5] ........................ B05B 11/00; G01F 11/00

[52] U.S. Cl. .................................... 222/321; 222/341; 222/385; 222/402.2

[58] Field of Search ............. 222/321, 341, 385, 402.2

[56] References Cited

U.S. PATENT DOCUMENTS

| | | | |
|---|---|---|---|
| 4,930,999 | 6/1990 | Brunet et al. | 222/321 X |
| 4,944,432 | 7/1990 | Jouillat | 222/321 |
| 4,964,547 | 10/1990 | Lina | 222/385 |
| 5,105,994 | 4/1992 | Jouillat et al. | 222/341 |

FOREIGN PATENT DOCUMENTS

| | | |
|---|---|---|
| 2497774 | 12/1980 | European Pat. Off. . |
| 0145909 | 6/1985 | European Pat. Off. . |
| 04203 | 12/1982 | PCT Int'l Appl. . |

*Primary Examiner*—Andres Kashnikow
*Assistant Examiner*—Lesley D. Morris
*Attorney, Agent, or Firm*—Sughrue, Mion, Zinn, Macpeak & Seas

[57] ABSTRACT

A precompression metering pump has already been mounted on a pressurized receptacle in the prior art. It serves not only to propel the contents of the receptacle for spraying purposes, but also to isolate said contents from ambient air in order to prevent it being degraded. However, in the past such a pump has been provided with a return spring capable of raising the pistons of the pump to a rest position regardless of the pressure inside the receptacle. Consequently, should a leak arise from the receptacle, there has been a danger of delivering a substance that has been degraded by contact with the atmosphere. The present invention avoids this problem by making spraying impossible should the pressure inside the receptacle fall below a predetermined pressure which is advantageously chosen to lie in the range 1 bar to 2 bars above atmospheric pressure. This is achieved by reducing the stiffness of the spring so that the pistons are raised in part only by the spring expanding and in part also by the force transmitted by the pressure that exists inside the receptacle.

3 Claims, 1 Drawing Sheet

FIGURE
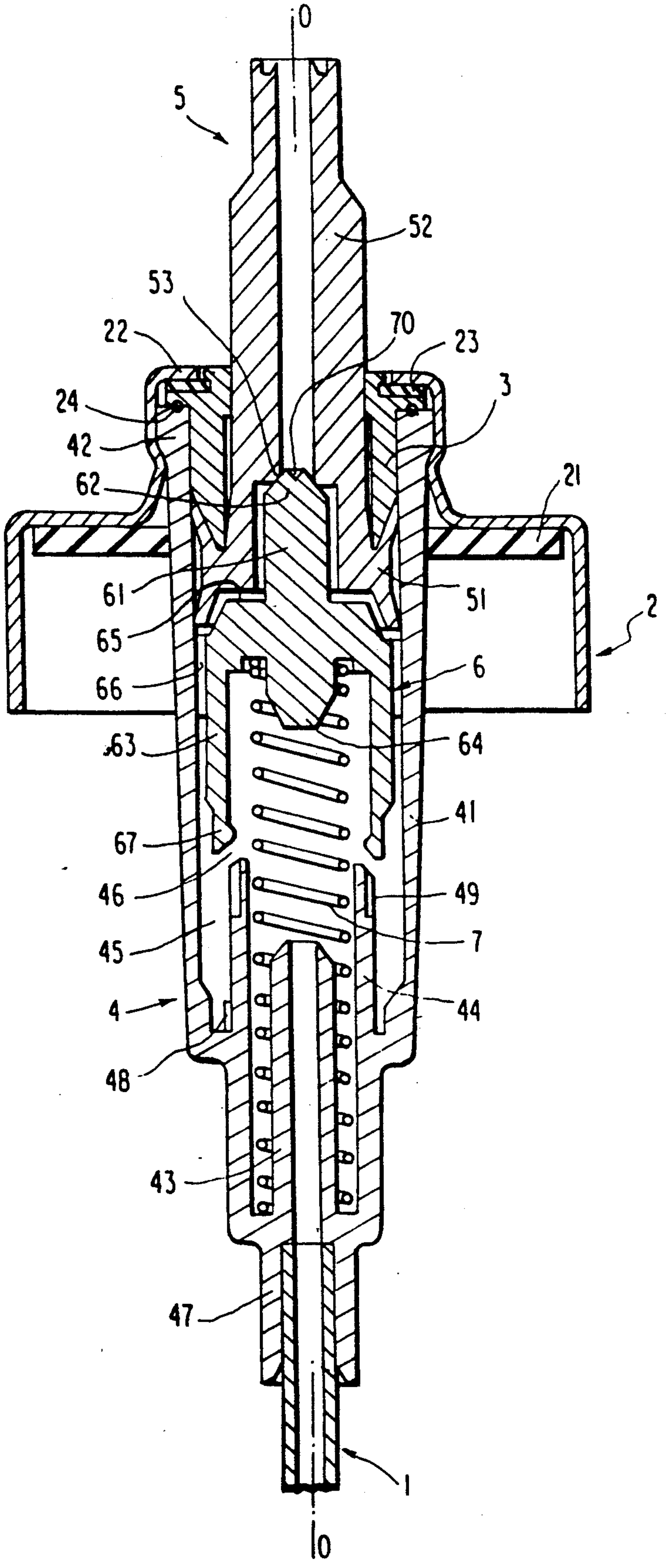

INTRINSICALLY SAFE METERING PUMP FOR A PRESSURIZED SPRAY HEAD

The present invention relates to a spray metering pump that operates only when mounted on a receptacle that is under pressure. In practice, the corresponding receptacle contains both a liquid to be sprayed and a gas suitable for expanding as the receptacle empties, thereby keeping the pressure inside the receptacle at a level higher than atmospheric pressure. The gas may be dissolved in the liquid, e.g. freon, or it may not be dissolved, e.g. nitrogen. In association with a pump, the gas does not serve to propel the liquid from the receptacle, but merely to prevent the liquid that remains in the receptacle coming into contact with ambient air. The resulting spray device is particularly advantageous in pharmaceutical applications. Some preparations oxidize on coming into contact with the air or they may be contaminated by germs present in the atmosphere. They then lose their medicinal properties, and may even become toxic.

BACKGROUND OF THE INVENTION

A spray metering pump suitable for use on a receptacle that is under pressure is known in the prior art. It is described in greater detail with reference to the sole accompanying figure. Several variants can be found in French patent application No. 2 620 052 filed in 1987 by Valois. For the time being, it is merely specified that there is nothing to prevent this pump from operating when the pressure inside the receptacle has fallen to atmospheric pressure. In other words, in the event of gas leaking from the receptacle and a certain amount of air taking its place, there is a risk of administering a liquid that is unsuitable.

Thus an object of the present invention is to modify the prior art metering pump so as to make spraying impossible in the event of gas leaking from the receptacle.

SUMMARY OF THE INVENTION

To this end, the present invention provides an intrinsically safe metering pump for a pressurized spray head, said metering pump being mounted in gastight manner on a receptacle containing both a liquid to be sprayed and a gas, said metering pump comprising, disposed around a common axis of revolution:

a pump body communicating with said receptacle via an open cylinder extending inside said pump body and having at least one outside projection at at least one of its ends;

a first hallow piston slidably mounted inside said pump body to slide along a stroke that is delimited by abutment means, said first piston having a base at its end adjacent to said receptacle in gastight contact with said pump body for isolating a pump chamber inside said pump body from the atmosphere, and having a hollow rod including an internal section narrowing at its end opposite from said receptacle;

a differential second piston slidably mounted inside said pump body with a skirt at its receptacle end, said skirt having a free end adapted to fit in gastight manner over said open cylinder of said pump body to form an admission non-return valve for admitting said liquid from said receptacle to said pump chamber, and having a punch at its end opposite to said receptacle, with the tip of the punch being truncated to serve as a bearing surface for a needle engaged inside said hollow rod of said first piston, said tip coming into abutment against said narrowing to constitute together therewith an outlet non-return valve for passing said liquid from said pump chamber to the atmosphere; and a return spring disposed between said second piston and said pump body;

wherein after said liquid contained in said pump chamber has been sprayed, said spring exerts a return force capable of opening said admission non-return valve only if the pressure within said receptacle is greater than a predetermined pressure.

For example, said predetermined pressure is selected to lie in the range 1 bar to 2 bars above atmospheric pressure. Preferably, the greater the predetermined pressure, the lower the stiffness of said return spring.

BRIEF DESCRIPTION OF THE DRAWING

An embodiment of the invention is described by way of example with reference to the accompanying drawing, in which the sole FIGURE is a longitudinal section showing a prior art precompression metering pump as mentioned above and to which the present improvement applies.

DETAILED DESCRIPTION

After the summary below of the prior art and the following description of the present improvement, it will nevertheless be understood that the FIGURE also constitutes a representation of a precompression metering pump of the invention.

Before dealing with the substance of the present improvement, this description begins with one example of a prior art metering pump. Its structure and its operation are described as is the way in which such a pump is suitable for filling the receptacle with gas under pressure. This description is made with reference to the sole FIGURE. This FIGURE shows, in particular, that the various component parts of the pump are circularly symmetrical about an axis OO: a crimping collar 2 which is generally made of a deformable metal for fitting in airtight manner via a gasket 21 to the neck of a receptacle (not shown), said receptacle containing the supply of liquid to be sprayed together with a certain quantity of gas under pressure; an endpiece 3 held by a shoulder 22 of the collar 2 and retaining an intermediate sealing washer 23; a pump body 4 formed on the outside by a cylinder 41 having an open end 42 which receives the endpiece 3 as a force-fit; an annular sealing ring 24 providing a gastight fixing therefor; an opposite end of the pump body terminated by a sleeve 47 suitable for receiving a dip tube 1 extending substantially down to the bottom of the receptacle; and a hollow piston 5 having a base 51 in abutment against the endpiece 3, but capable of sliding in sealed manner inside the pump body 4 via two peripheral lips, and extending outside the pump body 4 in the form of a hollow rod 52 that is narrower than the pump body and that is adapted to be guided with clearance within the endpiece 3.

The pump body 4 also encloses a second piston 6 of a very particular shape. At one of its ends it has a punch 61 terminated by a cone 62 whose truncated tip includes a small depression 70, and which engages inside the rod 52 of the hollow piston 5, and abuts against an internal narrowing 53 in the rod 52. The other end of the piston 6 is constituted by a cylindrical skirt 63 provided with outside fins 66 for guiding it along the inside wall of the cylinder 41. Inside the skirt 63, the piston 6 has a finger 64 centered on the axis OO of revolution of the pump. The finger 64 projects in such a manner as to enable one of the ends of a cylindrical spring 7 to engage thereon and bear thereagainst while the spring remains coaxial with the metering pump assembly. In the embodiment shown in the FIGURE, the opposite end of the spring 7 bears against the bottom of the pump body 4 opposite to its open end 42. Two hollow cylinders 43 and 44 extend inside the pump body 4 and part of the spring 7 is engaged between them.

When no external force is applied to the metering pump, the various components 1 to 7 as described above are disposed relative to one another as shown in the FIGURE, i.e. the FIGURE corresponds to the pump being in its rest position. In this configuration, the pump chamber 45 which is essentially determined by the angular space situated between the cylinders 41 and 44 of the pump body 4 communicates with the receptacle via the dip tube 1. The respective lengths of the skirt 63 and of the open cylinder 44 are selected in such a manner as to leave an annular passage 46 between these two components. Thus, the chamber 45 is at the same pressure Po as the pressure inside the receptacle. This pressure generally lies in the range 2 bars to 6 bars depending on the quantity of gas present. Given the shape of the second piston 6, it follows that there exists a force for urging the piston 6 against the hollow piston 5, in addition to the force provided by the return spring 7. These two pistons are applied against each other at the conical end 62 of the punch 61 and at the narrowing 53 inside the rod 52. The relatively resilient nature of the parts assists in achieving sealed contact which contributes to isolating the chamber 45 from the outside. In addition, the pressure within the chamber 45 urges the inside lip of the base 51 against the cylinder 41. The chamber 45 of the pump which is under pressure is thus completely isolated from ambient air. Once the pump has been primed, it is full of liquid, but the above-described disposition prevents any danger of the liquid deteriorating.

When sufficient compression force is exerted on the end of the rod 52 to overcome: the pressure of the liquid on the pistons; the friction between the base 51 of the hollow piston 5 and the cylinder 41 of the pump body 4; and the resistance of the spring 7; then the skirt 63 of the second piston 6 begins to fit around the open cylinder 44. The passage 46 then disappears. In a first variant embodiment of the prior art pump mentioned at the beginning, the open cylinder 44 includes hollows 49 at its free edge. Depending on circumstances, these hollows 49 may be constituted simply by grooves such as those shown on the outside surface of the open cylinder 44, or they may consist in cut-outs in its wall (not shown). Thus, during the initial instants of the skirt 63 fitting over the open cylinder 44, the pump chamber 45 remains in communication with the receptacle via the hollows 49 and in spite of a sealing lip being present at the free end 67 of the skirt 63. Its only when this lip reaches the level where the open cylinder 44 is complete that the pump chamber 45 is isolated both from ambient air and from the receptacle. In a second variant embodiment of the pump (not shown) where the open cylinder 44 has no hollows, comparable isolation is achieved as soon as the skirt 63 fits thereabout.

If the external compression then likewise exceeds friction between the skirt 63 and the open cylinder 44, then the volume of the chamber 44 decreases so that the skirt 63 fits progressively over the open cylinder 44. This increases the pressure of the liquid trapped inside the chamber 45. However, the chamber 45 communicates in particular via the gaps between the fins 66 situated along the outside wall of the skirt 63 with a small space 65 provided between the base 51 of the hollow piston 5 and the second piston 6 (if necessary with the assistance of suitable fins). As a result the same increase pressure $P_p$ is exerted on the end 67 of the skirt 63 and on the top face of the second piston 6 which is larger in area. In general, this pressure $P_p$ is referred to as the "precompression" pressure and is thus substantially greater than Po. This gives rise to forces parallel to the axis OO and the resultant thereof tends to bring the second piston 6 into the inside of the pump body 4 in opposition to the spring 7 and to the pressure Po that exists inside the receptacle. The punch 61 therefore withdraws a little from the narrowing 53 and a passage opens to pass liquid from the chamber 45 to the outside.

Spraying thus continues throughout the entire descent of the pistons, with the continual reduction in volume of the pump chamber maintaining its mean pressure to a value slightly greater than $P_p$. However, there comes a moment when this phenomenon is exhausted, and the pistons do not move down fast enough relative to the speed with which the liquid contained inside the chamber escapes to the outside. The liquid still remaining in the chamber is thus rapidly subjected to a pressure close to $P_p$. This pressure is not capable of retracting the punch 61 from the narrowing 53 so the outlet valve closes. For some prior art metering pumps, e.g. those in the first above-mentioned variant, this takes place before the free end 67 of the skirt 63 touches one or more of the ribs 48 projecting from the root of the open cylinder 44 where it meets the pump body 4. Consequently, it may be advantageous to dispose them so as to enhance pump priming in accordance with a method that is well-known. However, should engagement of the free end 67 of the skirt 63 over the rib(s) 48 be objectionable, then additional abutment means (not shown) may easily be provided to limit the extent to which the pistons, and in particular the piston 5, can be depressed. Although there is then no longer any possibility of facilitating priming, ribs 48 and abutment means are advantageous, for example, in the context of the second variant prior art metering pump mentioned herein (not shown). However, the role played by the rib(s) 48 in this second variant is not explained below.

In any event, once the user sees that liquid is no longer being delivered, compression is soon released. The spring 7 and the pressure Po of the receptacle then both contribute to exerting a force inside the skirt 63 which causes both pistons to move simultaneously upwards inside the pump body 4. The volume of the pump chamber 47 then increases again. However, throughout substantially all of the movement of the pistons, the chamber remains completely isolated with the free end 67 of the skirt 63 running along the solid wall of the open cylinder 44. The liquid that it still contains after spraying thus sees its pressure $P_r$ reduced. In fact, the pump is sized in such a manner that $P_r$ becomes considerably lower than the pressure Po inside the receptacle when the pistons have practically completed moving up within the pump body. Thus, when the passage 46 is reopened, liquid is sucked strongly from the receptacle into the pump chamber. The pump chamber is then filled so that subsequent compression of the rod 52 causes spraying to take place by the mechanism described above.

Another typical aspect of the prior art metering pump to which the present improvement applies relates to putting the receptacle under pressure by means of a gas. The gas is inserted by means of a duct placed hermetically over the rod 52 and the hollow piston 5. The duct has a needle which is engaged inside the rod 52 so that the end of the needle is received in the depression 70 at the end of the punch 61. The needle can then push the second piston 6 back into the pump body 4. This opens the outlet valve constituted by the cone 62 of the punch 61 coming into abutment against the internal narrowing 53 of the rod 52. Simultaneously, the admission valve into the pump chamber 45 is opened. To do this, the prior art metering pump provided means for breaking the sealing between the open cylinder 44 and the free end 67 of the skirt 63 when the skirt is pushed down a certain distance. In the first variant embodiment mentioned above, these means are constituted by the recesses or hollows 49 carried by the free edge of the open cylinder 45. The corresponding engagement depth is then relatively little, with the free end 67 of the skirt 63 overlying the recesses 49. In contrast, in the second variant (not shown), interfitting must be complete so that the free end 67 of the skirt 63 engages over the rib(s) 48 at the root of the open cylinder 44. Once this has occurred, the duct is put into communication with the receptacle successively via the space 65, the gaps between the fins 66 around the skirt 63, and the gaps between the ribs 48, or the gaps formed directly by the recesses 49. Gas under pressure can thus be injected without difficulty into the inside of the receptacle that is closed by the metering pump.

In prior art metering pumps designed and operating as described above, particular mention is made of the mechanism for raising the pistons after spraying has taken place. This mechanism is driven firstly by the spring 7 which seeks to expand and secondly by the pressure Po that exists inside the receptacle and which bears against the inside of the skirt 63. In the past, the spring 7 has been rated so as to be capable on its own of thrusting the pistons back fully. In other words, the pistons are returned independently of the pressure Po that exists inside the receptacle. If said pressure should drop because of a leak, then the pistons used to be returned just as though the pump had been actuated under its initial operating conditions.

The present invention prevents such identical operation taking place by rating the spring 7 differently. According to the present invention, the spring provides only a fraction of the force required for returning the pistons, and the pressure Po is relied on for ensuring that this action is completed. In other words, the return force delivered by the present spring 7 is less than used to be the case, other things being equal. For example, for a pump emitting 100 μl per dose, the return force provided by the spring 7 when in a deformation state corresponding to the pump being in the rest position (see figure) used to be 600 to 700 grams force (gf) in the prior art, whereas it now lies in the range 150 gf to 200 gf. This considerable reduction is not obtained in practice by deforming the spring to a lesser extent initially. The small size of the pump and thus the small size of the housing available for the spring makes it necessary, on the contrary, to reduce the stiffness of the spring by an appropriate selection of the spring material used.

In practice, the spring 7 of the present invention is rated on the basis of a prior choice for the minimum acceptable pressure P'o. This is the smallest pressure that may exist inside the receptacle while still allowing the pistons of the pump to be returned. Advantageously, P'o is selected to lie in the range 1 bar to 2 bars. This ensures that the present pump cannot deliver doses that have come into contact with ambient air. Should the pressure inside the receptacle drop because of a leak (which generally happens relatively slowly because of the numerous sealing members provided), then there comes a moment when the pressure of marginally less than P'o exists. The user can then dispense the dose of liquid contained in the pump chamber. However, when the user ceases to press on the pump after spraying, the two positions remain sufficiently far down inside the pump body to ensure that the pump chamber remains completely isolated. As a result, no matter how much the user actuates the pump thereafter, no more liquid is dispensed since the pump chamber does not fill. Similarly, ambient air is not sucked into the receptacle. There is thus no risk of the user administering a dose of unsuitable liquid. In other words the spray head is intrinsically safe.

We claim:

1. An intrinsically safe metering pump for a pressurized spray head, said metering pump being mounted in gastight manner on a receptacle containing both a liquid to be sprayed and a gas, said metering pump comprising, disposed around a common axis of revolution:
   - a pump body communicating with said receptacle via an open cylinder extending inside said pump body and having at least one outside projection at at least one of its ends;
   - a first hollow piston slidably mounted inside said pump body to slide along a stroke that is delimited by abutment means, said first piston having a base at its end adjacent to said receptacle in gastight contact with said pump body for isolating a pump chamber inside said pump body from the atmosphere, and having a hollow rod including an internal section narrowing at its end opposite from said receptacle;
   - a differential second piston slidably mounted inside said pump body with a skirt at its receptacle end, said skirt having a free end adapted to fit in gastight manner over said open cylinder of said pump body to form an admission non-return valve for admitting said liquid from said receptacle to said pump chamber, and having a punch at its end opposite to said receptacle, with the tip of the punch being truncated to serve as a bearing surface for a needle engaged inside said hollow rod of said first piston, said tip coming into abutment against a narrowing to constitute together therewith an outlet non-return valve for passing said liquid from said pump chamber to the atmosphere; and
   - a return spring disposed between said second piston and said pump body;

wherein after said liquid contained in said pump chamber has been sprayed, said spring exerts a return force capable of opening said admission non-return valve only if the pressure within said receptacle is greater than a predetermined pressure.

2. A metering pump according to claim 1, wherein said predetermined pressure is selected to lie in the range 1 bar to 2 bars above atmospheric pressure.

3. A metering pump according to claim 1, wherein the greater the said predetermined pressure, the lower the stiffness of said return spring.

* * * * *